(12) United States Patent
Frouin et al.

(10) Patent No.: US 6,528,610 B1
(45) Date of Patent: Mar. 4, 2003

(54) EXTERIOR COATING, COMPOSITION USED FOR SUCH COATINGS AND METHOD FOR OBTAINING SAME

(75) Inventors: Laurent Frouin, L'Hay-les-Roses (FR); Thierry Jeannette, Garches (FR); Minou Nabavi, Paris (FR); Evelyne Prat, Pantin (FR)

(73) Assignee: Rhodia Chimie, Courbevoie Cedex (FR)

( * ) Notice: Subject to any disclaimer, the term of this patent is extended or adjusted under 35 U.S.C. 154(b) by 0 days.

(21) Appl. No.: 09/367,602

(22) PCT Filed: Mar. 2, 1998

(86) PCT No.: PCT/FR98/00404

§ 371 (c)(1),
(2), (4) Date: Dec. 8, 1999

(87) PCT Pub. No.: WO98/38231

PCT Pub. Date: Sep. 3, 1998

(30) Foreign Application Priority Data

Feb. 28, 1997 (FR) .............................................. 97 02408
Jun. 30, 1997 (FR) .............................................. 97 08215

(51) Int. Cl.⁷ .............................................. C08G 18/40
(52) U.S. Cl. ........................... 528/85; 528/48; 524/366; 524/591; 524/800; 524/839; 428/423.1
(58) Field of Search .................................. 524/591, 800, 524/839, 840, 845, 366; 528/48, 85; 428/423.1

(56) References Cited

U.S. PATENT DOCUMENTS

| | | | | |
|---|---|---|---|---|
| 3,779,970 A | * | 12/1973 | Evani et al. | 260/29.6 RW |
| 4,618,390 A | * | 10/1986 | Powell | 156/307.3 |
| 4,954,559 A | * | 9/1990 | Den Hartog et al. | 524/507 |
| 5,466,745 A | * | 11/1995 | Fiori et al. | 524/801 |

FOREIGN PATENT DOCUMENTS

| | | |
|---|---|---|
| DE | 40 07 637 A | 9/1991 |
| EP | 0 367 120 | 5/1990 |
| EP | 0 663 413 A | 7/1995 |
| EP | 0 739 961 | 10/1996 |
| EP | 0 680 983 | 9/1999 |
| WO | 97 31960 | 9/1997 |

* cited by examiner

*Primary Examiner*—Nathan M. Nutter
*Assistant Examiner*—Melanie Bissett
(74) *Attorney, Agent, or Firm*—Burns, Doane, Swecker & Mathis, L.L.P.

(57) ABSTRACT

Composition which is useful for exterior coatings, comprising, for successive or simultaneous addition, an aqueous phase comprising a polyol dispersion or solution whose glass transition temperature ($t_g$) is not more than 100° C.; and an isocyanate sub-composition already emulsified or to be emulsified in the aqueous phase.

21 Claims, No Drawings

EXTERIOR COATING, COMPOSITION USED FOR SUCH COATINGS AND METHOD FOR OBTAINING SAME

The present invention relates to an industrial floorcovering or exterior coating, to a composition which is useful for such coatings and to a process for obtaining these coatings.

The invention relates more particularly to the combination of certain polyols with certain isocyanate formulations.

The coatings described in the invention are particularly advantageous for application to metallic supports, but it especially solves a problem for nonmetallic supports, among which mention may be made of plant supports such as wood and mainly mineral supports, of variable porosity, such as concrete, plaster, stone or phosphomagnesium support.

It is thus possible to obtain coatings of controlled permeability (waterproof [impermeability to liquids] while at the same time allowing the support to breathe [permeability to gases]) whose depth of penetration into the support and flexibility may be adjusted by modifying, in particular, the size and Tg of the polyol as well as the nature of the surfactant used.

These coatings may be applied without problem to wet supports.

These coatings may be used for interiors or exteriors, on horizontal or vertical walls with particular success:

- as a topcoat for industrial floors (in general mineral or wood support): the abrasion strength is improved and the permeability to water is reduced, thus giving hard-wearing floors which are easy to maintain;
- as a leakproofing coating: a flexible leaktight coating can be formed by impregnation, and can be applied to exteriors at low temperature in the presence of moisture, without any problems of cracking arising.

The term "coating" means, in particular:

1) Impregnation "Resins"

These products are intended to penetrate into and fill pores, to a depth ranging from 0.1 to 3 mm and more depending on the porosity of the support, generally from 0.5 to 3 mm.

They are generally applied by spraying or by brush in order to help the penetration into the support. Their function is to reduce the porosity, reduce soiling, facilitate cleaning and improve the hard-wearing nature and reinforce the mechanical properties.

The impregnation resins known in the art are based on epoxides, polyurethanes, polymethyl methacrylate or polyester.

2) Paints, Coatings (stricto sensu)

These are thin films of at least about $10^{-2}$ mm, generally from 0.1 to 1 mm, based on synthetic epoxy, polyurethane or methacrylate resins, used alone or combined, and which generally contain fine fillers and pigments.

They are applied to horizontal or vertical supports, by brush, by roller, by scraper or by spraying.

In the case of application to a horizontal support, semi-thick coatings may be obtained by dusting fillers onto a fresh coat.

These floorcoverings are intended, as with the impregnation resins, to reduce the porosity of the support, thereby reducing the formation of dust, facilitating cleaning, improving the abrasion resistance, the resistance to corrosive chemical agents: acids, bases, solvents, oils, etc.

3) Synthetic Resin Screeds (Including Selfsmoothing Coatings)

Selflevelling floors can consist of mixtures of resins and fillers applied to thicknesses of from 1 to 3 mm and floated, which give the floor a smooth appearance (suppression of the macroscopic coarseness) and/or which can be made skid-proof by dusting with fillers (silica, corundum, etc.).

Synthetic resin screeds are applied more thickly (4 mm to 1.5 cm).

A coating should be obtained which has very good mechanical and chemical characteristics and a beautiful esthetic appearance.

In particular, high compressive and flexural strengths should be obtained ($R_{compression}$:60 to 120 MPa–$R_{flexure}$:28 to 45 MPa)

The screeds should be particularly abrasion-resistant and recommended for use in areas sustaining heavy traffic, and should also have good chemical resistance to attack.

One of the aims of the present invention is to provide polyurethane resins which give, in particular, flexible coatings which mask the existing cracks in the support and which can resist cracking induced by the support.

Such compositions are useful in particular for varnishes (to the constraints of which they lend themselves particularly well), but also for paints. More generally, they can be useful for any application using the properties of isocyanate condensation.

In the rest of the present description, the term "dispersion" will be used for polymers containing hydroxyl functions and in particular polyols, while the expression "emulsions" will be used for blocked or unblocked isocyanates.

The use of organic solvents is increasingly being criticized by the authorities in charge of safety at work, since these solvents, or at least some of them, are reputed to be toxic or chronotoxic. For this reason, efforts are being made to develop more and more techniques which replace the solvent-medium techniques or which reduce the amount of solvent in order to overcome the drawbacks associated with solvents.

One of the solutions most frequently used lies in the use of emulsions or dispersions in water.

In order to prepare films of paints or varnishes, two dispersions are mixed together, an emulsion containing the isocyanate, which may be blocked, and a polyol dispersion.

The mixture of the dispersions, which can also contain pigments and fillers, is then applied to a support in the form of a film with the aid of standard techniques for using industrial paints or resins. When the preparation contains blocked isocyanates, the film+support assembly is cured at a temperature which is sufficient to release the isocyanate functions and to condense them with hydroxyl groups of the polyol particles. However, such techniques are virtually impossible to perform successfully externally.

In the present description, the particle size characteristics often refer to notations of the type $d_n$ in which n is a number from 1 to 99; this notation is well known in many technical fields, but is slightly less common in chemistry, and it may thus be useful to recall its meaning. This notation represents the particle size such that n% (by weight, or more exactly by mass, since weight is not an amount of matter but rather a force) of the particles is less than or equal to said size.

In the description hereinbelow, the polydispersity index will be used, which is defined as $$I=(d_{90}-d_{10})/d_{50}$$

Typically, the average size ratios, or the $d_{50}$ when it can be determined, between the isocyanate emulsion and the polyol dispersion are between 2 and 200. Thus, the average sizes of the isocyanate emulsions manufactured according to the technique described in the French patent application filed on 31.03.1993 under No. 93/03795 and published under No.

2,703,358 on 07.10.94, have average sizes of between 0.1 and 10 micrometers and more generally between 0.3 and 2 micrometers. The polyol dispersions used in combination with these emulsions have average sizes, measured by quasielastic light scattering, of between 20 and 200 nanometers and more generally between 50 and 150 nanometers.

When, as is generally the case, dispersions of different sizes are mixed together so as to obtain molar ratios between the NCO and OH groups of between 0.3 to 10 and more preferably between 0.8 and 1.5, instability of the mixtures of the two dispersions is observed.

By way of example, this instability is reflected by a macroscopic separation which takes place rapidly, generally within a few minutes, to give a fluid phase, on the one hand, and a very viscous phase, on the other hand.

The result is that not only are these mixtures impossible to store, but also it is extremely difficult to apply this mixture to the surface which it is desired to cover or impregnate by the usual techniques for applying paints and varnishes. If these unstable mixtures are applied to a support, such as a glass or metal plate, the resulting film is not transparent but, rather, appears opaque and heterogeneous and is thus unsuitable.

These problems are particularly acute in the case of masked or unmasked isocyanates, when they are mixed with insoluble polyols, dispersed in water.

In addition, in the case of coatings intended for exteriors, the coating must be resistant to bad weather and in particular to large temperature variations which may be from about 30 to 50° C., or even 80° C. [for example between −20 and +60° C.].

Accordingly, one of the aims of the present invention is to provide a composition which makes it possible to prepare high-quality exterior coatings or paints which show good resistance to bad weather.

Another aim of the invention is to provide a composition which makes it possible to prepare industrial floorcoverings as described previously (impregnation resin, self-smoothing coatings, resin screeds, etc.) making it possible in particular to:

reduce the porosity of the support to water, while at the same time allowing vapour to pass through;

increase the resistance to dust formation and has the ease of cleaning;

increase the resistance to chemical attack (by acids, solvents, etc.);

improve the mechanical properties of the support and enhance its abrasion resistance.

Another aim of the present invention is to provide a composition of the above type which requires little or no solvent.

Another aim of the present invention is to provide a composition, in particular a varnish, which is capable of protecting architectonic concretes.

Another aim of the present invention is to provide a composition of the above type which is rapidly (not more than two hours) dust-free.

These aims and others which will become apparent later are achieved by means of a composition which is useful in particular for exterior coatings, characterized in that it comprises, for successive or simultaneous addition an aqueous phase comprising at least one polyol dispersion whose glass transition temperature ($t_g$) is not more than 100° C., advantageously not more than 50° C.;

an isocyanate sub-composition already emulsified or t o be emulsified.

Advantageously, the polyol consisting of one or more latices (it should be recalled that a latex is a population of particles of the same composition dispersed in a continuous phase; in the present description, when there are several populations [one population per composition] in the same continuous phase, it will be considered that there are several latices) has a glass transition temperature ($t_g$) of between −50° C. and +40° C.; in the case of a mixture, this constraint applies to at least one of the latices, preferably to all. It is especially important in the case of using a single latex, in this case the upper limit preferably being lower.

When a latex with a high Tg is used, very hard, rigid coatings are obtained, which are particularly suitable for industrial floors.

For greater flexibility (in particular elongation at break) and better resistance to bad weather (rapid change in external temperature, in particular in the course of a single day-night cycle), it is desirable for the polyol, or at least one of the polyols when there are several, to have a $t_g$ of less than 0° C., advantageously less than −10° C., preferably less than −20° C., or even −30° C. in extremely harsh countries.

For good adhesion to the support, a $t_g$ (in the case of a latex mixture, of at least one of the latices) which is not higher than the application temperature (of the precursor composition of the coating on the support) is recommended.

To prepare films of paints or varnishes, a mixture of two dispersions in a (same) continuous phase is used. These dispersions form two populations of particles; one, the emulsion containing the isocyanate, which may be blocked, and the other, a polyol dispersion. This mixture may be prepared by mixing a suspension and a dispersion, but more generally by dispersing a second constituent in the continuous phase of a first constituent. Usually, the isocyanate is emulsified in the aqueous phase of the polyol dispersion.

It is desirable for the polyol dispersion(s) used in combination with these emulsions to have average sizes, measured by quasielastic light scattering, at least equal to about 10 nm, advantageously to about 20 nm, preferably to about 50 nm, and of not more than about 200 nanometers, advantageously not more than 150 nanometers and preferably not more than 100 nm.

The production of polyol and in particular of polyol latex at variable glass transition temperature (high or low) can be achieved by modifying the content of comonomer(s) giving rigid homopolymers and the content of comonomer(s) giving flexible homopolymers. Thus, the replacement of methyl methacrylate with butyl acrylate makes it possible to significantly lower the glass transition temperature and to achieve the above values.

Advantageously, the polyol can comprise carboxylic or sulfhonic ionic groups, but it can also comprise no ionic groups.

In the context of the present invention, it has been shown that the presence of an anionic carboxylate function ($—CO_2^-$) significantly increases the drying kinetics, which is particularly advantageous for obtaining rapid "dust-free" drying, in particular when operating externally. A significant effect can be noted for a ratio of at least one carboxylic function to about 20 functions containing reactive hydrogen [alcohol or phenol function], advantageously for a ratio of one to about 10, preferably for a ratio of one to about 5; however, it is desirable for this ratio to be (in the case of several polyols, on average and/or for the polyol which has the richest alcohol function content) at most equal to one function to one function, preferably one carboxylic function to two -ol functions. The carboxylate countercations advantageously satisfy the same preferences as those explained for the countercations in the compound according to the present invention.

The polyol can already be in aqueous or water-soluble or water-dispersible medium.

This can be an aqueous solution (which can be obtained in particular after neutralization of the ionic groups) or an emulsion of the polymer in water or a latex-type dispersion.

In general, the term "polyol" means any mineral or, preferably, organic polymer containing OH functions.

However, the polyols which are preferred for the invention are latices as described below.

It appears to be possible to disperse a standard polyisocyanate in a water-soluble polyol under Ad certain formulation conditions (in particular with a suitable ratio of pigment to paint binder). However, the use of standard polyisocyanates with water-dispersed polyols (such as resin or latex emulsions) often poses problems of incompatibility (flocculation, appearance of several phases, etc.). One of the many advantages of the preparation according to the invention is that it offers great freedom of choice for the formulation (physical form of the polyol, ratio of pigment to binder, ease of incorporation into aqueous media).

Moreover, it has been found through the typical values of coatings (in particular chemical resistance and hardness) that the crosslinking of the films is much greater when the polyol used is carboxylated.

In particular, it is advantageously possible to use latices, especially nanolatices (i.e. latices whose particle size is nanometric [more specifically whose $d_{50}$ value is not more than about 100 nanometers]).

Thus, according to one of the particularly advantageous embodiments of the present invention, the polyol is advantageously a nanometer-sized latex which has the following characteristics:

$d_{50}$ (or more usually average diameter) of between 15 and 60 nm, advantageously between 20 and 40 nm solids content (as polyol, i.e. excluding isocyanate, filler [for example pigment] and adjuvant): between 10 and 50%, advantageously between 25 and 40% a $d_{80}$ value of less than 1 micrometer.

As regards the following values, they are directed toward the case of using a polyol alone, otherwise they are average values:

carboxylate function of 0.5 to 5% by mass ($COO^-=44$)

-ol function: at least 1, advantageously at least 1.5, preferably at least 2% and not more than 6%, advantageously not more than 4% and preferably not more than 3% (OH by mass=17).

In addition, especially when their glass transition temperature is less than 0° C., advantageously less than −10° C. and preferably less than −20° C., the latices allow high-quality resistance to bad weather and in particular to temperature variations to be obtained, even with aromatic isocyanates, which is particularly suitable for exterior coatings or coatings deposited on supports which already show cracks or are liable to crack.

It may be particularly advantageous to adjust the flexibility of the coatings by modifying the Tg of the latex.

Thus, a latex with a high Tg value can give rigid coatings with improved mechanical properties, etc.

According to one particularly advantageous embodiment of the present invention, a mixture of polyol dispersions (latex mixture) is used comprising at least two polyols (two latices) or classes of polyols associated in pairs.

It is thus possible to combine a latex (or several latices) A with a content (as a percentage by mass) of accessible OH functions at least equal to 1% (about 0.3 milliequivalent per gram), advantageously equal to 1.5%, preferably equal to 2%, with a latex (or several latices) B with a poor content of alcohol functions (less than 1%, advantageously less than 0.8%, preferably less than 0.5%).

A latex with a tg of greater than room temperature (about 20° C.) can be combined with a latex (which can advantageously be the latex or (one of) the latices B above) whose tg is less than room temperature, advantageously less than 10° C., preferably less than 0° C., more preferably whose tg is between −10° C. and −40° C.

Latices with different particle sizes can also be mixed together to improve the coefficient of filling.

These latices can be used simultaneously or successively. Thus, a precoat of latex of type B can advantageously be made before using the composition formed from latex A and emulsified isocyanate according to the invention.

The ratio between the latices can range between 90/10 and 10/90, but it is preferable for the average content of OH functions (mass=17) to be at least equal to a value between 1 and 5%, advantageously between 1.5 and 4% and preferably between 2 and 3%.

Carboxylic functions which are not more than 5 nanometers from the surface, and hydroxyl (alcohol) functions which are not more than 10 nanometers from the surface [particle-continuous phase (usually aqueous phase) interface for the latices] are considered as being accessible.

The molar ratio between the free isocyanate functions and the hydroxyl functions is between 0.5 and 2.5, advantageously between 0.8 and 1.6, advantageously between 1 and 1.4.

The latices (not functionalized with isocyanate, optionally masked) described in the French patent application filed on Apr. 28, 1995, No. 95/05123, and in the corresponding European patent application No. EP 0,739,961, give very good results; to assist in comprehension of this passage, reference may be made to this text.

Thus, advantageously, the latex particles have on average an accessible acid function (advantageously carboxylic acid function) content of between 0.2 and 1.5, advantageously between 0.2 and 1.2 milliequivalent/gram of solid material and they have on average an accessible primary alcohol function content of between 0.3 and 2 milliequivalent/gram, advantageously between 0.3 and 1.5.

Thus, as indicated in this document, the preferred latices are those consisting of particles bearing function(s) according to the invention, are hydrophobic and advantageously have a size ($d_{90}$) generally of between 0.01 micrometer and 10 micrometers and preferably not more than 5 micrometers, or even 2 micrometers. They are calibrated, monodisperse and present in the latex in a proportion ranging between 0.2 and 65% by weight relative to the total weight of the latex.

The weight-average molecular mass ($M_w$, preferably determined by gel permeation chromatography, known as "GPC") of the polymers constituting the particles of the latices is advantageously between $5 \times 10^4$ and $5 \times 10^6$, greater than $1.1 \times 10^5$ and not more than $2 \times 10^6$.

The alcohol functions or the acid, preferably carboxylic acid, functions can also be obtained by hydrolysis of alcohol-generating functions (ester, ether, halide, etc.) or acid-generating functions (ester, anhydride, acid chloride, amide, nitrile, etc.).

The distribution between the various types of units advantageously satisfies the following rules:

The content of unit derived from the monomer consisting of said free alcohol containing an activated ethylenic function, and relative to the total amount of units of any kind, is advantageously between 3 and 15%, preferably between 4 and 10% (mole or equivalent).

According to one advantageous embodiment of the present invention, the unit is derived from an ester of an α-ethylenic acid with a diol, one of the alcohol functions of which remains nonesterified. Said diol is advantageously an ω/ω' diol, advantageously chosen from 1,4-butanediol, 1,3-propanediol and glycol.

It is desirable for said α-ethylenic acid to be an optionally substituted acrylic acid.

According to one preferred embodiment of the present invention, the content of unit derived from a free carboxylic acid (or in the form of one of its salts), and relative to the total amount of units of any kind, is between 2 and 10% (mole).

For economic reasons, it is often advantageous for said free acid to be an optionally monosubstituted acrylic acid or one of its salts.

The particles obtained from the present invention can consist of two separate polymers, the first constituting the core and the second constituting the periphery. This type of particle can be obtained by epipolymerization [in which a latex seed is coated by surface polymerization (epipolymerization, occasionally referred to as superpolymerization)] of a separate polymer. The core is occasionally known as the seed by analogy with the phenomenon of crystallization. In this case, only the second polymer, i.e. the surface polymer, satisfies the concentration constraints for the various functions according to the present invention.

The mass ratio between the isocyanates to be suspended and said compounds comprising an anionic function and advantageously a polyethylene glycol chain fragment is usually not more than ⅓, advantageously not more than about 20%, preferably not more than about 10%, (in the present description, the term "about" is used to emphasize the fact that when the figure(s) furthest to the right in a number are zeros, these zeros are positional zeros rather than significant figures, unless, of course, otherwise specified).

The mass ratio between the isocyanates to be. suspended and said compound comprising an anionic function and advantageously a polyethylene glycol chain fragment is advantageously greater than 1%, preferably greater than 2%.

It is also desirable for the amount of said compound(s) comprising an anionic function and advantageously a polyethylene glycol chain fragment to correspond to a value of between $10^{-2}$ and 1, advantageously between $5 \times 10^{-2}$ and 0.5 E atom (cf. formula 1) per liter.

Thus, the mass ratio between the isocyanates to be suspended and said compound comprising an anionic function and advantageously a polyethylene glycol chain fragment is advantageously at least equal to 2%, preferably to 4%, and not more than about 20%, preferably not more than about 10%, and thus this mass ratio is advantageously between 2 and about 20%, preferably between 4 and about 10%.

According to one particularly advantageous embodiment of the present invention, after dispersing or emulsifying, the sum of the constituents of the binder (i.e. the mass contents of the isocyanate(s), emulsifier(s) and polyol(s)) in water is not more than 80%, advantageously not more than 70%, preferably not more than 60%, and is at least equal to 10%, advantageously equal to 20%, preferably equal to 30%. Thus, the solids content ranges, for the preferred zone, from 30 to 70% relative to the total amount of composition in the binder.

The isocyanate emulsions can be made in various ways and with various surfactants; it is possible in particular to use, on the one hand, the surfactants described in the published patent application EP 691,993 filed in the name of the Applicant under French priority No. 93/03795 and No. 93/03796, and, on the other hand, the technique described therein. Alternatively of course, the two can be used together.

According to one preferred embodiment of the present invention, self-emulsifying compositions (i.e. compositions which form an emulsion with moderate stirring, for example the stirring in Example 1) are used, for example as described in patent application No. 96/02710 of Feb. 29, 1996 and in the PCT application claiming its priority.

Thus, as mentioned in the above patent application, it is possible to use emulsions prepared from a composition based on isocyanate(s), which is (are) advantageously unmasked, comprising at least one compound comprising an anionic function and advantageously a polyethylene glycol chain fragment of at least 1 and preferably of at least 5 ethylenyloxy units

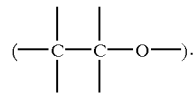

Thus, the present invention is directed toward, by successive or simultaneous addition, a composition comprising, in particular:
   a sub-composition which is a vector of isocyanate functions, the preferred characteristics of which will be specified later, and
   a surfactant containing at least one compound comprising an anionic function and advantageously a polyethylene glycol chain fragment containing at least 1 and preferably at least 5 ethylenyloxy units

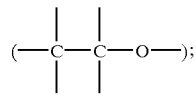

optionally, an aqueous phase.

According to the present invention, said compound can be used alone, or as a mixture with one or more surfactants. These surfactants can be agents which also satisfy the above obligation of comprising an anionic function and advantageously a polyethylene glycol chain fragment preferably of at least 5 ethylenyloxy units.

These optional surfactants can also be chosen from other ionic compounds [in particular aryl and/or alkyl sulfhate(s) or phosphate(s) (obviously, aryl in particular encompasses alkylaryls and alkyl in particular encompasses aralkyls), aryl or alkyl phosphonate, phosphinate or sulfhonate, fatty acid salt and/or zwitterionic salt] and from nonionic compounds which may or may not be blocked at the end of the chain (however, the nonionic compounds containing alcohol functions on at least one of the chains appear to have a slightly unfavorable effect on the (self)emulsion, although they have a favorable effect on other aspects of the paint composition; taking all of this into account, it is preferable that the content of this type of compound should represent not more than one-third, advantageously not more than one-fifth, preferably not more than one-tenth, of the mass of said anionic compounds according to the invention).

Advantageously, said compound contains a hydrophilic part formed of said anionic function, said (optional) polyethylene glycol chain fragment, and a lipophilic part based on a hydrocarbon-based radical.

Said lipophilic part is generally chosen from alkyl groups [in the present description alk-yl is taken in its etymological sense as the hydrocarbon-based residue of an alkan-ol after ignoring the alcohol (or -ol) function]; and aryl groups. When the number of ethylene glycol functions is not more than 5, the simple alkyls are advantageously branched, advantageously $C_8$ to $C_{12}$, the aralkyls are $C_{12}$ to $C_{16}$, the alkylaryls are $C_{10}$ to $C_{14}$ and the simple aryls are $C_{10}$ to $C_{16}$. If not, the lipophilic part can vary widely, especially when the number of ethylene glycol units is greater than 10, and can thus constitute a hydrocarbon-based radical of at least 1, advantageously of at least 3, and containing not more than 25, advantageously not more than 20, carbon atoms.

Advantageously, said compound corresponds to formula I below:

$$\underset{(^-O)_p}{\overset{(O)_m}{\overset{\|}{E}}}\underset{X}{\overset{X'}{<}}\left(\begin{array}{c}\diagup\diagdown_O(\diagdown\diagup_O)_s\diagdown O^{R_2}\\ \diagdown\diagup_O(\diagdown\diagup_O)_n\diagdown O^{R_1}\end{array}\right)_q$$

where q represents zero or 1;

where p represents an integer between 1 and 2 (closed intervals, i.e. including the limits);

where m represents zero or an integer between 1 and 2 (closed intervals, i.e. including the limits);

where X and X', which may be similar or different, represent an arm containing not more than two carbon-based chain members;

where s is zero or an integer chosen between 1 and 30, advantageously between 5 and 25, preferably between 9 and 20 (closed intervals, i.e. including the limits);

where n is zero or an integer chosen between 1 and 30, advantageously between 5 and 25, preferably between 9 and 20 (closed intervals, i.e. including the limits);

where E is an element chosen from carbon and the metalloid elements of atomic rank at least equal to that of phosphorus and belonging to column VB or to the chalcogens of atomic rank at least equal to that of sulfhur;

where $R_1$ and $R_2$, which may be similar or different, represent a hydrocarbon-based radical advantageously chosen from optionally substituted aryls and alkyls.

Although this does not form part of the preferred compounds, it should be noted that s and/or n can be equal to zero, with the condition that E is phosphorus and that when s and n are equal to zero, $R_1$ and/or $R_2$, respectively, are $C_8$ to $C_{12}$ alkyls, which are advantageously branched, or a $C_{12}$ to $C_{16}$ aralkyl or a $C_{10}$ to $C_{14}$ alkylaryl.

One of the divalent radicals X and X' can also be a radical of the type ($[EO_m(O^-)_p]$) so as to form pyroacids such as the symmetrical or unsymmetrical diesters of pyrophosphoric acid.

The total carbon number of the anionic compounds toward which the present invention is directed is advantageously not more than about 100, preferably not more than about 50.

The divalent radicals X and optionally X' are advantageously chosen from divalent radicals consisting of (the left-hand part of the formula being linked to the first E):

when E is P, one of the groups X or X' can be O—P(O)(O⁻)-X"—;

when E is P, one of the groups X or X' can be —O—($R_{10}$—O)P(O)—X"—; ($R_{10}$ being defined below) (X" representing an oxygen or a single bond);

a direct bond between E and the first ethylene of said polyethylene glycol chain fragment;

methylenes which are optionally substituted and, in this case, advantageously partially functionalized;

the arms of structure —Y— and of structure —D—Y—, —Y—D—, —Y—D—Y' where Y represents a chalcogen (advantageously chosen from the lightest, namely sulfhur and especially oxygen), the metalloid elements of the atomic ranks at most equal to that of phosphorus and belonging to column VB, in the form of amine derivatives or tertiary phosphine derivatives (the radical ensuring the tertiary nature advantageously containing not more than 4 carbon atoms, preferably not more than 2 carbon atoms);

where D represents an optionally substituted alkylene, including a functionalized alkylene, D advantageously being ethylene or methylene, preferably ethylene in the structures —D—Y— and especially —Y—D—Y', and methylene in the structures —Y—D—.

Thus, E represents an atom chosen from carbon atoms (advantageously, in this case, m=1 and p=1, the prototype of this type of compound is a polyethoxylated alcohol acid [for example lactic acid or glycolic acid]), atoms which give pnictides (elements from column VB) (advantageously, in this case, m=1 or 0 and p=1 or 2), chalcogen atoms of a higher rank than oxygen (advantageously, in this case, m=1 or 2 and p=1 and q=0).

Thus, when E is a chalcogen atom, formula I advantageously simplifies to:

$$\underset{(^-O)_p}{\overset{(O)_m}{\overset{\|}{E}}}\diagdown X\diagup\diagdown(\diagup\diagdown_O)_n\diagdown O^{R_1}$$

Advantageously, E represents carbon and especially phosphorus or sulfhur, preferably phosphorus:

in the latter case, formula (I) becomes formula (II):

$$\underset{(^-O)_p}{\overset{(O)_m}{\overset{\|}{E}}}\underset{X}{\overset{X'}{<}}\left(\begin{array}{c}\diagup\diagdown_O(\diagdown\diagup_O)_s\diagdown O^{R_2}\\ \diagdown\diagup_O(\diagdown\diagup_O)_n\diagdown O^{R_1}\end{array}\right)_q$$

with, when q is zero:

$$\underset{(^-O)_p}{\overset{(O)_m}{\overset{\|}{P}}}\diagdown X\diagup\diagdown(\diagup\diagdown_O)_n\diagdown O^{R_1}$$

where p represents zero or an integer between 1 and 2 (closed intervals, i.e. including the limits);

where m represents zero or an integer between 1 and 2 (closed intervals, i.e. including the limits);

where the sum p+m+q is not more than three;

where the sum 1+p+2m+q is equal to three or five;

where X and X', which may be similar or different, represent an arm containing not more than two carbon-based chain members;

where n and s, which may be similar or different, represent an integer chosen between 5 and 30, advantageously between 5 and 25, preferably between 9 and 20 (closed intervals, i.e. including the limits); where $R_1$ and $R_2$, which may be similar or different, represent a hydrocarbon-based radical advantageously chosen from aryls and alkyls optionally substituted in particular with a halogen atom, in particular fluorine.

The Periodic Table of the Elements used in the present application is the one in the supplement to the Bulletin de la Société Chimique de France, January 1966, No. 1.

The optional functionalization of the alkylenes, and in particular methylenes (X and X'), is carried out by hydrophilic functions (tertiary amines and other anionic functions, including those described above [$EO_m(O^-)_p$]).

The counteraction is advantageously monovalent and is chosen from inorganic cations and organic cations that are advantageously nonnucleophilic and, consequently, of quaternary or tertiary nature (in particular oniums from column V, such as phosphonium, ammoniums, or even from column VI, such as sulfhonium, etc.) and mixtures thereof, usually ammoniums, generally derived from an amine, advantageously a tertiary amine. Advantageously, an organic cation containing a hydrogen which is reactive with the isocyanate function is avoided. This results in a preference for tertiary amines.

The inorganic cations can be sequestered by phase-transfer agents such as crown ethers.

The pKa of the cations (organic [ammonium, etc.] or inorganic) is advantageously between 8 and 12.

The cations, and in particular the amines, corresponding to the ammoniums, advantageously have no surfactant property, but it is desirable that they should have good solubility, or in any case sufficient solubility to ensure that of said compounds containing an anionic function and advantageously a polyethylene glycol chain fragment, in aqueous phase and at the working concentration. Tertiary amines containing not more than 12 carbon atoms, advantageously not more than 10 carbon atoms, preferably not more than 8 carbon atoms, per "onium" function (it is reminded that there is preferably only one of these per molecule) are preferred. The amines can contain other functions, and in particular functions corresponding to amino acid functions and cyclic ether functions such as N-methylmorpholine, or otherwise. These other functions are advantageously in a form which does not react with the isocyanate functions and does not significantly impair the solubility in aqueous phase.

It is very desirable for the anionic compounds according to the present invention to be in a neutralized form, such that the pH induced during a dissolution or a placing in contact with water is at least equal to 3, advantageously to 4, preferably to 5, and not more than 12, advantageously not more than 11, preferably not more than 10.

When E is phosphorus, it is desirable to use mixtures of monoester and of diester in a molar ratio of between 1/10 and 10, advantageously between 1/4 and 4. Such mixtures can also contain from 1% to about 20% (it is, however, preferable for this not to exceed about 10%) by mass of phosphoric acid (which will advantageously be at least partially salified so as to be within the recommended pH zones) and from 0 to 5% of pyrophosphoric acid esters.

The mass ratio between the surfactant compounds (including said compound comprising an anionic function and advantageously a polyethylene glycol chain fragment) and the isocyanates is very preferably between 4 and about 10%. The recommended zones will be explained later.

The composition can also comprise a catalyst, advantageously a latent catalyst (which can be released by the action of external agents, for example visible or UV radiation, oxygen).

The isocyanate composition according to the invention can, after dispersion or emulsification in an aqueous phase, comprise a water content of from 10 to 70%. The emulsion is an oil-in-water emulsion.

However, in the course of the study which led to the present invention, in particular in the case of aliphatic isocyanates (i.e. isocyanates connected to the hydrocarbon-based skeleton (i.e. a skeleton containing both hydrogen and carbon) via a saturated ($sp^3$) carbon), it has been shown that there is a risk of various reactions getting out of control when certain proportions of water are reached. Thus, it is recommended to avoid compositions in which the mass ratio between the amount of water in the aqueous phase, on the one hand, and the sum of the isocyanate and the surfactant according to the invention, on the other hand, is between $10^{-2}$ and 0.5. If greater safety is desired, ratios between $10^{-3}$ and 1 will be avoided.

The emulsions obtained have, for the isocyanate part, $d_{50}$ values at least equal to 0.1 micrometer, usually 0.5 micrometer, and they have a $d_{50}$, preferably a $d_{80}$, advantageously less than or equal to (at most equal to) 5 micrometers, preferably 3 micrometers.

The choice of isocyanates is a compromise between the price and the technical performance. The most economical are aromatic isocyanates (i.e. those whose isocyanate function is connected to an $sp^2$ carbon) and it must be acknowledged that the results obtained with this type of compound using the present invention are satisfactory when compared with the prior art for aromatic compounds. However, as outlined below, the best results are obtained with aliphatic compounds and especially those recommended by the present invention (in particular for coating ceramics, especially for exteriors: such as bricks, tiles, etc.).

It is preferred to use isocyanates with an average functionality of between 2.5 and 4 and whose viscosity is low (not more than 1500 mPa.s, preferably not more than 1000 mPa.s).

According to one particularly advantageous embodiment of the present invention, after dispersion or emulsification, the sum of the constituents in the binder (i.e. the mass contents of the isocyanate(s), emulsifier(s) and polyol(s)), in water ranges from 10, advantageously from 30 to 70% relative to the total amount of the composition.

The isocyanates targeted by the invention in particular comprise the compounds detailed below.

These compounds can advantageously contain the structures common in this field, for example prepolymers derived from the condensation of polyol (for example trimethylol propane), in general triol (which is advantageously primary, see later regarding the definition of the polyols) and especially the most common structures, i.e. those of isocyanurate type, also known as trimer, uretidine dione structures, also known as dimer, biuret or allophanate structures or a combination of structures of this type on a single molecule or as a mixture.

If it is desired to lower the solvent content of the composition substantially, in particular when it is in emulsion form, it is preferable to use mixtures of this type which naturally (i.e. without addition of solvent) have a low viscosity. The compounds with this property are especially the derivatives (such as isocyanurate, also known as trimer, uretidine dione structures, also known as dimer, biuret or allophanate structures or a combination of structures of this type on a single molecule or as a mixture), partial and/or total, of the aliphatic isocyanates whose isocyanate functions are connected to the skeleton via ethylene fragments (for example polymethylene diisocyanates, in particular hexamethylene diisocyanate and those arylenedialkylene diisocyanates whose isocyanate function is remote from the aromatic rings by at least two carbons, such as (OCN—$[CH_2]_t$-Φ-$[CH_2]_u$—NCO) with t and u greater than 1). These compounds or mixtures advantageously have a viscosity at most equal to about 3000 centipoises (or millipascal.seconds), preferably to about 1500 centipoises (or millipascal.seconds).

When these values are not reached, it is then often useful to bring the mixture to these viscosity values by adding a minimum amount of suitable solvent(s). As already mentioned above, the isocyanates concerned can be mono-, di- or even polyisocyanates. Advantageously, these derivatives can contain structures of isocyanurate type, also known as trimer, uretidine dione structures, also known as dimer, biuret or allophanate structures or a combination of structures of this type on a single molecule or as a mixture.

The isocyanate monomers can be:
  aliphatic, including cycloaliphatic and arylaliphatic, such as:
    like simple aliphatic, polymethylene diisocyanates and in particular hexamethylene diisocyanate;
    like partially aliphatic "neopentyl" partially cyclic (cycloaliphatic) isophorone diisocyanate (IPDI);
    like cyclic aliphatic (cycloaliphatic) diisocyanate, those derived from norbornane;
    arylenedialkylene diisocyanates (such as OCN—$CH_2$-Φ-$CH_2$—NCO, a portion of which shows no essential difference from the aliphatics, i.e. those whose isocyanate function is remote from the aromatic rings by at least two carbons, such as (OCN—$[CH_2]_t$-Φ-$[CH_2]_u$—NCO) with t and u greater than 1;
  or aromatics, such as tolylene diisocyanate.

The preferred polyisocyanates targeted by the technique of the invention are those in which at least one, advantageously two, preferably three, of the conditions below are satisfied:
  at least one, advantageously at least two, of the NCO functions are connected to a hydrocarbon-based skeleton via a saturated ($sp^3$) carbon, preferably with at least one, more preferably at least two, of the subconditions below:
    at least one, advantageously two, of said saturated ($sp^3$) carbons bears at least one, advantageously two, hydrogen(s), (in other words, it has been found that better results are obtained when the carbon bearing the isocyanate function bears a hydrogen, preferably two hydrogens);
    at least one, advantageously two, of said saturated ($sp^3$) carbons are themselves borne by a carbon, which is advantageously aliphatic (i.e. of $sp^3$ hybridization), which itself bears at least one, advantageously two, hydrogen(s); in other words, it has been found that better results are obtained when the carbon bearing the isocyanate function is not in a so-called "neopentyl" position;
  all the carbons via which the isocyanate functions are connected to the hydrocarbon-based skeleton are saturated ($sp^3$) carbons which advantageously partly, preferably totally, bear a hydrogen, preferably two hydrogens; in addition, it is advantageous for said saturated ($sp^3$) carbons themselves to be at least partially (advantageously one-third, preferably two-thirds), preferably totally, borne by a carbon, advantageously an aliphatic carbon (i.e. a carbon of $sp^3$ hybridization), which itself bears at least one, advantageously two, hydrogen(s); in other words, it has been found that better results are obtained when the carbon bearing the isocyanate function was not in a so-called "neopentyl" position;
  particularly suitable polyisocyanates are those which contain, at least partially, an isocyanuric or biuret skeleton (whether this skeleton is derived from only one or from several monomers, see below) and more specifically structures such as isocyanurate, also known as trimer, uretidine dione structures, also known as dimer, biuret or allophanate structures or a combination of structures of this type on a single molecule or as a mixture.

When the polyisocyanates are relatively heavy, i.e. when they comprise at least 4 isocyanate functions, the first two conditions become:
  at least one-third, advantageously two-thirds, of the NCO functions are connected to a hydrocarbon-based skeleton via a saturated ($sp^3$) carbon;
  at least one-third, advantageously two-thirds, of said saturated ($sp^3$) carbons bears at least one, advantageously two, hydrogen(s), (in other words, it has been found that better results are obtained when the carbon bearing the isocyanate function bears a hydrogen, preferably two hydrogens); in addition, it is advantageous for said saturated ($sp^3$) carbons themselves to be at least partially (advantageously one-third, preferably two-thirds), preferably totally, borne by a carbon, advantageously an aliphatic carbon (i.e. a carbon of $sp^3$ hybridization), which itself bears at least one, advantageously two, hydrogen(s); in other words, it has been found that better results are obtained when the carbon bearing the isocyanate function is not in a so-called "neopentyl" position.

The isocyanates, in particular the aliphatic isocyanates, react with some of the anionic compounds targeted. They react with the hydroxyl of the non-neutralized or poorly-neutralized acid functions. These compounds are also targeted by the present invention.

In particular, in the case of phosphates (m=1), they react to give compounds of the type:

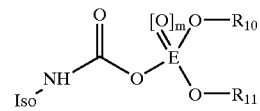

however, when E belongs to the phosphorus column and when m (which is the same as in formula I) is equal to zero, the compound is isomerized (or does so directly) to give:

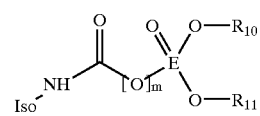

where E is an element from column VA of the Periodic Table of the Elements [(supplement to the Bulletin de la Société Chimique de France January 1966 No.1), advantageously phosphorus], and thus, in particular, of the type:

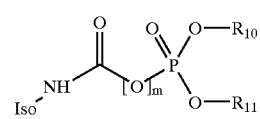

where Iso is the residue of a (poly)isocyanate (after removal of an isocyanate function),
where $R_{10}$ is a hydrocarbon-based residue (i.e. one containing hydrogen and carbon atoms) whose point of attachment [i.e. the atom bearing the open bond] is a carbon,
where $R_{11}$ is chosen from
  a negative charge

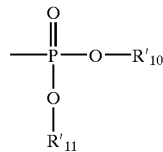

a group of formula II: in which $R'_{10}$ is chosen from hydrocarbon-based residues (which may be similar to or different from $R_{10}$) and a negative charge whose point of attachment [i.e. the atom bearing the open bond] is a carbon, in which the group(s) $R'_{11}$ is (are) chosen from hydrocarbon-based residues whose point of attachment [i.e. the atom bearing the open bond] is a carbon (which are similar to or different from $R_{10}$ and $R'_{11}$) and a negative charge.

It is desirable for at least one of the organic substituents ($R_{10}$; $R'_{11}$; $R'_{10}$) to contain a polyethylene glycol chain fragment advantageously of at least 5, preferably of at least 7, ethylenyloxy units. In other words, it is desirable for at least one of the organic substituents to correspond to the same formula as the substituents of E in the general formula I. More specifically, at least one of the organic substituents ($R_{10}$; $R'_{11}$; $R'_{10}$) corresponds to the formula:

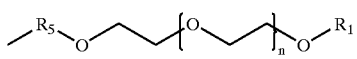

where $R_5$ represents an arm containing not more than two carbon-based chain members (with the same preferred values as X' and X);

where n is an integer chosen between 0 and 30, advantageously between 5 and 25, preferably between 9 and 20 (closed intervals, i.e. including the limits);

where $R_1$ represents a hydrocarbon-based radical advantageously chosen from optionally substituted aryls and alkyls.

Thus, according to an advantageous variant of the present invention, the compositions according to the present invention contain compounds derived from the reaction outlined above in an overall proportion, relative to a volume of one liter of isocyanate, of from 0.01 to 1, advantageously from 0.05 to 0.5, preferably from 0.05 to 0.3 function equivalent:

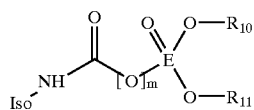

It is advantageous for the Iso radical to afford predominantly or totally, an aliphatic bond with the same preferences as those outlined above with regard to the isocyanates.

The compounds of formula:

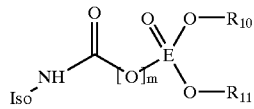

in which $R_{10}$ and $R_{11}$ can take the above values, but also, when m is 1, can be a negative charge on account of the fact that there may be significant amounts of residual phosphoric acid in certain batches, thus also form part of the invention Needless to say, $R_{10}$ can then also be equal to: .

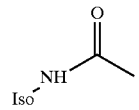

The Iso radical may or may not then be the same as that of the penultimate formula, in which Iso represents a polyisocyanate residue, advantageously the residue of a product of reaction of a diisocyanate monomer to form biuret or isocyanurates (trimer) or with a di- or polyol, advantageously a triol or a tetraol.

It is advantageous for the Iso radical to afford, predominantly or totally, an aliphatic bond with the same preferences as those outlined above with regard to the isocyanates.

In addition to the function featured in the formula, Iso advantageously bears at least one, and preferably at least two, isocyanate functions, preferably at least one of which is not masked, and more preferably at least two of which are not masked.

This aim and others which will become apparent hereinbelow are achieved by means of an emulsification process which comprises at least the following step:

addition, advantageously with very moderate stirring, of the isocyanate(s) to the polyol+water mixture.

The surfactant can be either in the aqueous phase or, preferably, in the isocyanate phase. In the first case, the reactions between isocyanate and said compound comprising an anionic function and advantageously a polyethylene glycol chain fragment are much more limited.

This stirring is preferably manual or mechanical.

This emulsification is advantageously conducted at a temperature below 50° C., preferably at room temperature.

It is desirable, if necessary, to adjust the pH (to reach a value advantageously at least equal to three, preferably 4, and advantageously not more than 11, preferably 10, and thus advantageously between 3 and 11, preferably between 4 and 10) during the emulsification. This adjustment makes it possible to arrive at an advantageous zone in which the first (or only) acidity of each surfactant according to the present invention is neutralized.

According to one advantageous variant of the present invention, the pigments (and in particular the titanium dioxide) and fillers (in particular fillers such as silica, corundum, silicon carbide, etc.), which give improved abrasion resistance and (or) a skid-proof nature, are dispersed in the polyol(s) before addition of the isocyanate.

Another aim of the present invention is to provide a process for applying the isocyanate-based composition to form a coating.

These aims and others which will become apparent hereinbelow are achieved by means of a process comprising the application of a preparative coat (i.e. a coat of composition according to the invention comprising the aqueous phase and the constituents of the coat) whose thickness before drying will range between 0.01 and 15 mm, depending on whether it is an impregnation resin, a paint, a selfsmoothing coating or a resin screed. In the case of paints, the thickness before drying is at least equal to 10 μm (micrometer), advantageously 50 μm (micrometer), preferably 100 μm (micrometer) and is not more than 1000 μm (micrometer), advantageously not more than 400 micrometers, preferably 200 micrometers, corresponding, after drying, to a thickness of between 20 and 80, or even 200, micrometers.

According to one advantageous embodiment, this process comprises a drying operation from 20° C. to 60° C. for a period which can range from ¼ to 24 hours.

Advantageously, this drying operation takes place in the presence of a solvent to assist the removal of water.

According to one particularly advantageous embodiment of the present invention, the application is performed by spraying.

The preparation of the surfaces is well known to those skilled in the art (for example phosphatations for ferrous steel compounds or chromation for aluminum-based surfaces) (reference may be made, for example, to the following books: "Organic Coating Technology" Volume II by H. F. Payne and "Paint Handbook" edited by G. E. Weismantel).

For the specific case of concrete or stone supports, a treatment will be carried out which will be directed toward removing deposits or residues liable to reduce the adhesion (chalking, dust, waxes, curing products, organic soiling) by mechanical treatment (brushing, grinding, sanding, etc.).

According to the present invention, it is thus possible to obtain coatings (in particular paints or varnishes) which have the following technical characteristics (these values depend especially on the polyols used):

| Implementation and characteristics of the coating Iso2178 dry thickness: 45 µm Support and treatment thereof: steel treated by phosphatation: R461 plates from the supplier Q Pannel | | |
|---|---|---|
| | Minimum properties obtained | Usual |
| DIN test 67530 (these values are only of interest when a gloss paint is desired, but not when a matt or satin paint is desired) | | |
| 20° gloss | 0.5 | 80 |
| 60° | 0.5 | 90 |
| König Iso 1522 hardness | 10 s | 150 s |
| DIN 53151 adhesion test | GT-5 | GT-1 |
| Impact strength test No. Iso 6272 | | |
| direct | 10 cm | >100 cm |
| inverse | 5 cm | >100 cm |
| Resistance to methyl ethyl ketone (butanone) (Passage twice) | 20 | >200 |
| External QUV content DIN 53384 | 50 h | 800 h |

Rhodafac® RE610 is a mixture of phosphoric mono- and diesters according to formula II, the average formula of its hydrocarbon-based radical is a polyethoxylated (~ten times) nonylphenol. The molar ratio between monoester and diester is about 1 (mathematical approximation).

EXAMPLE 1

Preparation of Mixture 1

165 g of Tolonate® HDT (trimer-based isocyanurate oligomer) are mixed with 24 g of butyl acetate and 13 g of Rhodafac® RE610 (mixture of phosphoric mono- and diesters according to formula II) and 3 g of triethylamine. This mixture is stirred using a frame-paddle or deflocculating paddle for 5 minutes at 100 rpm. This mixture has a viscosity of 0.84 Pa.s at 20° C. and a coloration of less than 100 APHA.

EXAMPLE 2

Preparation of Mixture 2

79 g of Tolonate® HDT (trimer-based isocyanurate oligomer) are mixed with 10 g of butyl acetate and 9 g of Rhodafac® RE610 (mixture of phosphoric mono- and diesters according to formula II) and 1.4 g of triethylamine. This mixture is stirred using a frame-paddle or deflocculating paddle for 5 minutes at 100 rpm.

EXAMPLE 3

Nanolatex 1

The nanolatex used is an experimental product prepared according to the process described in the French patent application filed on Apr. 28, 1995, No. 95/05123 and in the corresponding European patent application No. EP 0,739,961, which has the following characteristics:

average diameter, evaluated by photometric counting (high-resolution transmission electron microscopy): between 25 and 30 nm carboxylate function: 2.5% by weight relative to the dry polymer -ol function: 2.5% by weight relative to the dry polymer molecular mass of greater than 100,000 solids content by weight: 29% pH about 8 minimum film formation temperature: about 20° C. to 25° C.

glass transition temperature: about 40° C. (between 40° C. and 50° C.)

EXAMPLE 4

Preparation of a Coating from Mixture 1 and Nanolatex 1

The varnish is prepared by incorporating 4.6 g of mixture 1 into 45.6 g of nanolatex, with manual mixing. This ratio corresponds to a ratio of the NCO/OH functions of 1.2.

The mixture thus prepared has a lifetime of 4 hours, which means that for 4 hours the viscosity and appearance of the mixture remain unchanged, but also that films formed from this mixture during these 4 hours have constant properties such as resistance to solvent, hardness and gloss.

The drying time of the film is remarkably short, 20 minutes for the "dust-free" time and 30 minutes for the "touch-dry" time according to standard NF T 30037. These measurements were made on glass plates for a dry film 40 µm in thickness and drying at 23° C. with 55% relative humidity.

The fact of obtaining a short drying time and a relatively long mixture lifetime constitutes an advantage which is highly desired by experts in the paints field.

The typical values of the coating are also very good overall; the following may be mentioned:

the Persoz hardness of the dry 50 µm film, measured on steel plate after drying for 24 hours at 23° C. and 55% relative humidity, is equal to 275 seconds.

the gloss at an angle of 20° of the film applied to steel plate is equal to 90.

the resistance to methyl ethyl ketone of the film dried for 7 days at 23° C. and 55% relative a humidity is greater than 200 to-and-fro cycles with a soaked pad of cottonwool.

the resistance to acids (20% sulfhuric acid, 10% nitric acid, 10% hydrochloric acid) is very good.

the resistance to alcohols (ethanol) and to hydrocarbons (gas oil) is also good.

the average resistance to bases (20% aqueous ammonia) is satisfactory.

These excellent performance levels of this nanolatex-polyisocyanate combination according to the invention can without doubt be attributed to the very specific physico-chemistry of these products, in particular to the very large specific surface of the nanolatex, which encourages greater homogeneity of crosslinking in the final polymer.

EXAMPLE 5

Application to Concrete Support

The mixture prepared in Example 4 is applied by brush at a rate of 200 g/m² to a concrete-type support.

After drying for 1 h at room temperature, the coating offers the support a water-repellency which is reflected by a pearling effect and reduced water absorption. Furthermore, the coating shows good abrasion resistance.

EXAMPLE 6

Nanolatex 2

The nanolatex is an experimental product described in the French patent application filed on Apr. 28, 1995, No. 95/05123 and in the corresponding European patent application No. EP 0,739,961, which has the following characteristics:

$d_{50}$: about 35 nm carboxylate function: 1% by weight relative to the dry polymer -ol function: 2.6% by weight relative to the dry polymer molecular mass: greater than 100,000 solids content by weight: 30% pH: about 8 glass transition temperature: about −30° C.

EXAMPLE 7

Preparation of a Coating from Mixture 1 and Nanolatex 2

The varnish is prepared by incorporating 4.6 g of mixture 1 into 45.6 g of nanolatex, with manual mixing. This ratio corresponds to a ratio of the NCO/OH functions of 1.2.

The coating is applied to concrete by brush at a rate of two 300 g/m² coats. Its great flexibility, generated mainly by the low Tg of the nanolatex, gives it a capacity to mask the cracks which may appear during ageing of the support (in particular on account of the dilation of the concrete caused by large temperature variation).

Furthermore, the crosslinking with the polyisocyanate according to the invention gives the coating excellent resistance to chemical agents and water.

The elongation at break of the film obtained is 4 times as great (40% as opposed to 10%) as in the case of latex 1 [cf. Example No. 4].

In addition, the coating shows good, if not excellent, freeze-thaw cycle resistance, namely:
- two hours at 60° C. with UV radiation and relative humidity of less than 50%;
- two hours at −20° C.;
- two hours at 20° C. with liquid water over the entire coated surface;
- two hours at −20° C.;
- two hours at 60° C. with UV radiation and relative humidity of less than 50%;
- two hours at 23° C. with relative humidity of greater than 95%.

The behaviour is just as good when the coating is submitted to the NF: XPP18420 cycle.

EXAMPLE 8

Nanolatex 3

The nanolatex is an experimental product described in the French patent application filed on Apr. 28, 1995, No. 95/05123 and in the corresponding European patent application No. EP 0,739,961, which has the following characteristics:

average diameter: evaluated by photometric counting (high-resolution transmission electron microscopy): between 25 and 40 nm carboxylate function: 2.5% by weight relative to the dry polymer -ol function: 0.4% by weight relative to the dry polymer molecular mass: greater than 100,000 solids content by weight: 30% pH: about 8 minimum film forming temperature: about 0° C.

glass transition temperature: about 16° C.

EXAMPLE No. 9

Nanolatex Mixture 75 grams of nanolatex 1 (described in Example 3) are mixed with 25 grams of nanolatex 3 (described in Example 8), with moderate stirring (3-blade stirrer) for 5 min.

EXAMPLE No. 10

Nanolatex Mixture 50 grams of nanolatex 1 (described in Example 3) are mixed with 50 grams of nanolatex 3 (described in Example 8), with moderate stirring (three-blade stirrer) for 5 min.

EXAMPLE No. 11

Preparation and Application of a Coating from Mixture 2 and Nanolatex 1

The resin is prepared by incorporating 13 g of mixture 2 into 100 g of nanolatex 1 with moderate stirring (three-blade stirrer) for 10 min. The ratio 13 g per 100 g corresponds to a ratio of the NCO/OH functions of 1.2.

The mixture thus prepared has a pot lifetime of at least 4 hours.

The coating is applied to a Fibrocement support by means of a pneumatic spray-gun at a rate of about 200 g/m².

EXAMPLE 12

Preparation and Application of a Coating from Mixture 2 and the Nanolatex Mixture of Example 9

The resin is prepared by incorporating 9.75 g of mixture 2 into 100 g of the nanolatex mixture of Example 9, with moderate stirring (three-blade stirrer) for 10 min.

The mixture thus prepared has a pot lifetime of at least 4 hours.

The coating is applied to a Fibrocement support by means of pneumatic spray-gun, at a rate of about 200 g/m².

EXAMPLE 13

Preparation and Application of a Coating from Mixture 2 and the Nanolatex Mixture of Example 10

The resin is prepared by incorporating 6.5 g of mixture 2 into 100 g of the nanolatex mixture of Example 10, with moderate stirring (three-blade stirrer) for 10 min.

The mixture thus prepared has a pot lifetime of at least 4 hours.

The coating is applied to a Fibrocement support by means of pneumatic spray-gun, at a rate of about 200 g/m².

Comparison of the Results: Adhesion of the Coating to the Fibrocement Support (Closed-pore Support)

The adhesion of the coating to the Fibrocement support was characterized by a grid test in accordance with ISO standard 2409.

Two tests were carried out on each coating:
adhesion after conditioning in air for 7 days at room temperature,
adhesion after conditioning in air for 7 days at room temperature and then immersion for 7 days in water at room temperature.

The results are given in the table below:

|  | Example 11 | Example 12 | Example 13 |
|---|---|---|---|
| Polyol with a high content of alcohol function and $t_g$ ~40° C. | 100% | ~75% | ~50% |
| Polyol with a low content of alcohol function and $t_g$ ~15° C. | 0% | ~25% | ~50% |
| Dry adhesion | Gt-3 | Gt-1 | Gt-1 |
| Adhesion after immersion | Gt-5 | Gt-2 | Gt-4-5 |
| Comments |  | The coating is stripped off as soon as the incisions are made | Large strip stripped off during rapid removal of the adhesive tape |

The coatings are all good when dry.

However, those containing a bimodal mixture of polyols (two levels of content of -ol functions) give better dry adhesion.

In wet adhesion, the compound based on only one latex is particularly mediocre; for the others, an optimum is observed as a function of the content of weakly hydroxylated latex.

The mechanical properties are not affected by the immersion and show good reversibility on drying.

What is claimed is:

1. Composition which is useful for exterior coatings, comprising,
   an aqueous phase comprising a polyol dispersion or solution whose glass transition temperature ($t_g$) is not more than 100° C., wherein the polyol dispersion or solution is formed of a first latex having a content of accessible OH functions at least equal to 1% by mass, and a second latex having a content of alcohol functions less than 1% by mass;
   an isocyanate sub-composition already emulsified or to be emulsified in the same aqueous phase; and
   a surfactant containing at least one compound comprising an anionic function and at least one ethylene oxide unit.

2. Composition according to claim 1, wherein said polyol dispersion or solution is in the form of one or more dispersions in the same continuous phase comprising two or more latices (population of particles of the same composition).

3. Composition according to claim 1, wherein said polyol dispersion or solution is in the form of two or more latices (population of particles of the same composition), at least one of which has a glass transition temperature ($t_g$) at most equal to the application temperature.

4. Composition according to claim 1, wherein said polyol dispersion or solution is in the form of two or more latices (population of particles of the same composition), at least one of which has a glass transition temperature ($t_g$) at most equal to room temperature (about 20° C.).

5. Composition according to claim 1, wherein said polyol dispersion or solution is in the form of at least two latices, at least one of which has a glass transition temperature ($t_g$) at most equal to the application temperature of said polyol dispersion or solution and represent(s) a mass fraction at least equal to ¼.

6. Composition for resisting rigorous cold temperatures according to claim 1, wherein said polyol dispersion or solution has a glass transition temperature ($t_g$) at most equal to 0° C.

7. Composition for resisting rigorous cold temperatures according to claim 1, wherein said polyol dispersion or solution is in the form of at least two latices, at least one of which has a glass transition temperature ($t_g$) at most equal to 0° C., and represent(s) a mass fraction at least equal to ¼.

8. Composition according to claim 1, wherein said polyol dispersion or solution is formed from at least two latices, at least one of which has a low hydroxyl content of less than about 0.3 milliequivalent/gram, the mass percentage of latex with said low hydroxyl content being between (closed interval) 10 and 90%.

9. Composition according to claim 1, wherein said polyol dispersion or solution is formed from at least two latices, at least one of which has a glass transition temperature ($t_g$) at least equal to 20° C., the mass percentage of latex with a low $t_g$ of less than about 20° C. being between (closed interval) 10 and 90%.

10. A process for the formation of a coating on a support of variable porosity comprising using the composition according to claim 1.

11. The process according to claim 10, wherein said support comprises nonmetallic surfaces, facade coverings, mortars and plasters or phosphomagnesium materials.

12. The process according to claim 11, wherein said support is of closed porosity.

13. The process according to claim 12, wherein said support is of variable inclination.

14. Process for preparing a coating according to claim 13, comprising the application of a coat of a composition of between 20 and 200 micrometers (measured when dry).

15. Process according to claim 14, comprising a drying operation from 10° C. to 50° C. for ¼ to 3 hours.

16. Process according to claim 14, comprising a drying operation in the presence of a solvent to assist the removal of water.

17. Process according to claim 14, wherein the coat is applied by spraying, or by means of a brush.

18. Coating which can be obtained by a process according to claim 14.

19. The composition of claim 1, wherein the composition is formed by successive or simultaneous addition of said aqueous phase comprising a polyol dispersion, said isocyanate sub-composition and said surfactant.

20. Composition according to claim 1, wherein the ratio between the first and second latices is between 90:10 and 10:90, and wherein the second latex has a $t_g$ lower than room temperature.

21. Composition according to claim 20, wherein the second latex has a $t_g$ less than 10° C.

* * * * *